UNITED STATES PATENT OFFICE.

LUDWIG OTTO HELMERS, OF HAMBURG, GERMANY, ASSIGNOR TO ICHTHYOL GESELLSCHAFT, CORDES, HERMANNI & CO., OF SAME PLACE.

COMPOUND OF SULFONIZED MINERAL OILS CONTAINING FORMALDEHYDE AND PROCESS OF MAKING SAME.

SPECIFICATION forming part of Letters Patent No. 674,412, dated May 21, 1901.

Application filed May 4, 1899. Serial No. 715,559. (No specimens.)

*To all whom it may concern:*

Be it known that I, LUDWIG OTTO HELMERS, doctor of philosophy, a subject of the German Emperor, residing at Hamburg, in the German Empire, have invented certain new and useful Improvements in Compounds of Sulfonized Mineral Oils Containing Formaldehyde and Processes of Making Same, of which the following is a specification.

My invention relates to the production of odorless and tasteless sulfur compounds obtained by the action of sulfuric acid or its substitutes on mineral or similar oils containing sulfur in the form of sulfid. When sulfur compounds of this class—such as thiol, petrosulfol, ichthyol, which are produced by the action of sulfuric acid on mineral oils or similar hydrocarbons—are treated with formaldehyde in aqueous solution at ordinary temperature, even when left standing for many days, no action takes place and the solutions remain perfectly clear. They smell distinctly of formaldehyde, and the original substances can be precipitated by means of alkali salts. These conditions, however, alter when heating for a considerable time is resorted to. By heating an aqueous solution of sulfonic acid or an acidulated solution of one of the above-named salts with formaldehyde for several hours at 100° there is gradually formed a pasty precipitation. By heating the salts in a neutral or alkaline solution no precipitation takes place; but there is an exception in this regard with ammoniacal salt, as in consequence of the reaction of the formaldehyde on the ammonia the reaction soon becomes sour, whereupon the freed sulfo acids react with the excess of formaldehyde.

Instead of heating the dilute aqueous solution of the initial substances and formaldehyde in a vessel the reaction products of the formaldehydes may be obtained by directly evaporating the liquids and then extracting the residue with water. The reaction product, which, however, in this case is difficult to clean, remains undissolved in the evaporating-pan.

The new substance obtained by either one of the methods by treatment with formaldehyde forms at first a pasty mass, which during the washing with water soon assumes a more solid form and which can be dried at 100° centigrade without melting. The substance so obtained forms a dark powder, which is odorless and tasteless, insoluble in water and in acids, and only slowly decomposed by alkalies. By their behavior toward alkalies they distinctly show their difference not only from the initial substances, which latter completely dissolve in water, as is well known, but also from the albumin (British Patent No. 11,344, of May 6, 1897) and from the gluten (gelatin) combinations of ichthyol and the like, which latter, although insoluble in water and in acids, can be easily dissolved in alkalies while splitting up into their components. This also explains the advantage obtained in therapeutics from the use of these new preparations. Consequent on their being difficult to dissolve in alkaline liquids the reaction products of the formaldehyde with the preparations combined with sulfur in the form of sulfid when taken for internal use become only slowly absorbed, and they thus exercise a weak, but long-enduring effect.

Example: Two kilograms of a twenty-five-per-cent. aqueous solution of ichthyol-sulfonic acid are mixed with one-fourth kilogram formaline (containing forty per cent. of formaldehyde) and heated for ten hours over a water-bath. After cooling the liquid is drawn off from the precipitation, and this is then repeatedly washed with water and finally dried at 100° centigrade.

Having fully described my invention, what I claim, and desire to secure by Letters Patent, is—

1. The process of producing odorless and tasteless preparations from sulfonized compounds derived from the reaction of sulfonic acid upon sulfureted hydrocarbons, which consists in reacting upon such compounds in acidulated solution with formaldehyde, and heating, whereby a tasteless odorless product is obtained containing sulfur, substantially as described.

2. As a new product of manufacture, the herein-described compound, consisting of formaldehyde and a sulfonized compound derived from sulfureted hydrocarbons, which preparation is of a greenish-brown color, contains sulfur, is insoluble in water and acids and odorless.

LUDWIG OTTO HELMERS.

Witnesses:
ALEXANDER SPECHT,
E. H. L. MUMMENHOFF.